Sept. 10, 1929.  P. M. HOTCHKIN  1,727,772
JOINT FOR LIGHTING SYSTEMS
Filed May 3, 1926
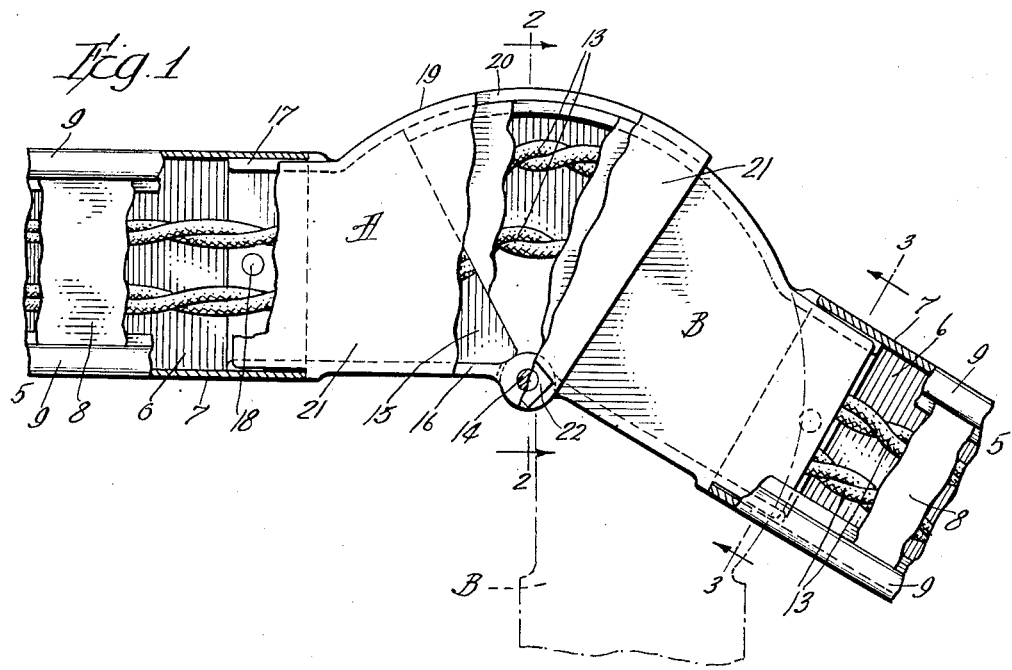
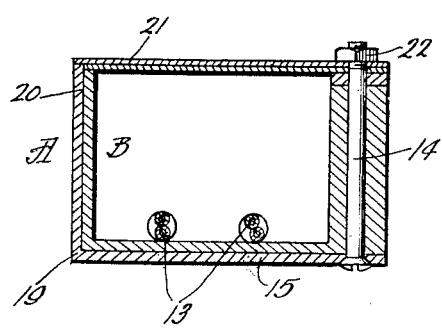
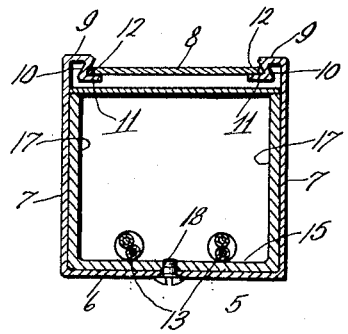
Inventor:
PAUL M. HOTCHKIN
By: E. F. Lundy
Atty.

Patented Sept. 10, 1929.

1,727,772

UNITED STATES PATENT OFFICE.

PAUL M. HOTCHKIN, OF CHICAGO, ILLINOIS.

JOINT FOR LIGHTING SYSTEMS.

Application filed May 3, 1926. Serial No. 106,579.

My invention relates to lighting systems wherein conduits are employed for enclosing and supporting the conductor wires, which conduits have mounted thereon one or more sockets or carriers for the reception of illuminating electric bulbs. More specifically, my invention relates to a swivel joint to be employed for connecting adjacent ends of sections of conduit so that the sections, when it is desired, may be disposed at an angle to each other.

Where an installation of a lighting system of the foregoing variety is required and the illumination is to occupy a space where there are corners in the plan, bends or breaks are required in the conduit, and it has been the usual practice to form the same by bending the conduit or by the use of couplings of 90°, 60° and 45°, or other usual angles. This necessitates the contractor or supply house carrying in stock a considerable quantity of couplings of different sizes and of different shapes in order to take care of installations that may require the divers angles. Heretofore there has also been provided an adjustable connection between adjacent ends of the conduit sections, but this has been found to be objectionable because of the difficulty in inserting the conductor wire through the respective members of the coupling and the same is heavy and cumbersome.

My present invention has for its object the provision of an angular or swivel coupling that may be used for connecting adjacent ends of the conduits and which may be adjusted to any degree of angularity from 1° to more than 90°, so that a single coupling may be used for any desired corner bend that may be required in a particular installation. With my present device the inherent objections to the prior structures are successfully overcome and the conductor wires may be readily placed in the usual conduit and the corner of my angular connector without having to thread or insert the wires longitudinally therein through a restricted space as has heretofore been the practice. Further objects of my invention reside in providing a connector structure for the adjacent ends of conduits, that is dependable in operation, economical to manufacture, novel in construction and compact in arrangement of the parts. I prefer to carry out my invention in substantially the manner hereinafter fully described and as more particularly pointed out in the claims, reference being made to the accompanying drawings that form a part of this specification.

In the drawings:

Fig. 1 is a top plan of my invention showing the same in conjunction with adjacent ends of two sections of conduit, parts of the structure being broken away for clearness.

Fig. 2 is a transverse section on line 2—2 of Fig. 1.

Fig. 3 is a transverse section on line 3—3 of Fig. 1.

The drawings are in a sense schematic for the purpose of illustrating a preferred or typical form of carrying out my invention and in the said drawings I have designated the same parts by similar reference characters wherever they appear in the several views.

The conduit which it may be desired to join for angular disposition by means of my present structure forms the subject-matter of my co-pending application for Letters Patent that is filed even date herewith, and the same consists of a mounting or support 5 for receiving the conductor wires that is preferably formed from a sheet-metal stamping of substantially U-shape in section and is elongated and has a bottom wall 6, parallel side-walls 7 and an open portion opposite the bottom wall. The edges of the side-walls farthest from the bottom wall are provided with inwardly extending S-shaped or Z-shaped guides to receive a suitable closure element 8. The S-shaped or Z-shaped guides just mentioned are formed by providing lateral flanges 9 that project towards each other from the edges of the side-walls and are substantially parallel with the plane of the bottom wall 6 of the housing. At the inner edges of these lateral flanges the sheet metal is bent downwardly and obliquely as at 10 towards the side walls 7 and it is then bent horizontally as at 11 so that oppositely disposed longitudinal channels or grooves 12 are provided in which the enclosure element, preferably a plate 8, is removably mounted. These housing members, together with the enclosure plates, are formed in suitable lengths for convenient storage and installation, and are adapted to have the conductor wires 13 placed therein and connected to socket elements mounted upon and carried by the housing at suitable intervals along the length of the latter.

When structures of this character are installed, it is frequently found that straight lengths of the housing may be used, but when a corner is desired it is usually the practice to interpose an elbow or the like. In lieu of this elbow I have provided an adjustable swivel joint or connector so that the connected lengths of housing upon each side of the joint or connector may be disposed at any desirable angle with respect to each other. This connector, as shown in the drawings, comprises two oppositely arranged sections A and B pivotally connected by a pin or bolt 14, one of which sections is of smaller dimensions than the other section so as to be telescoped thereby. The part A of the connector consists of a base plate 15, one edge of which is provided with an upstanding wall 16 that is straight and forms a continuation of the wall 7 of the adjacent housing section. The opposite edge of the base 15 has a straight portion provided with a vertical wall 17 that is parallel with the wall 16 but is of shorter length and the said walls 16 and 17 are of less height than the walls 7 of the adjacent housing section so that this end portion of the coupling section A may be inserted into the adjacent end of the housing section and secured therein by means of the screw 18. From the edge of the wall 17 the base plate is curved outwardly in an arc struck from the center of the pivotal pin 14 so as to provide a segmental portion 19 from which there extends upwardly the arcuate or segmental wall 20, which is of the same height as the walls 16 and 17. The cover plate 21 which is shaped to conform with the contour of the base plate 15 is placed upon the upper edges of the walls 16, 17 and 20 and is also inserted into the housing section when the coupling member A is placed therein and said cover plate is secured in position upon the top of the coupling member by means of a nut 22 screwed onto the upper extended end of the bolt or pivotal pin 14.

The other or co-acting section B of the coupling is of substantially the same shape as the coupling member A except that it is formed reversely and the dimensions are such as to permit the segmental shell thereof to be inserted into and co-operate with the segmental shell of the coupling section A, as seen in Figure 1 of the drawings. It will be seen from Figure 1, that the cover-plate of the coupling section B is disposed below the cover-plate 21 of the other coupling member and the end portions of the respective segmental shells are formed obliquely so that by loosening the nut 22 the parts may be moved to any desired degree of angularity with respect to each other. The broken line in Figure 1 shows the coupling members disposed at right angles or 90° to each other and the structures illustrated in full lines show the same as being arranged slightly oblique to each other. Prior to placing the cover plates in position upon the respective coupling members, the conductor wires 13 are laid in the bottom of the housing and through the coupling, as seen in the drawing, after which the cover plates are placed in their proper position upon the conduit sections and the coupling sections and the parts secured together.

It is possible that modifications or changes may be made to the structure herein disclosed, and I therefore desire it understood that the same are fully contemplated within the scope of the appended claims.

What I claim is:—

1. An adjustable joint for conduits and the like comprising a pair of channel members the ends of two adjacent walls of said members pivotally connected together for relative hinging movement of said members with respect to each other, a removable cover plate for each member disposed in normally overlapped relation, the remaining walls of said members extended beyond the pivoted walls and arranged in telescopic relation to each other, and common means for pivotally connecting said members and for maintaining said cover-plates in position.

2. An adjustable joint for conduits and the like comprising a pair of open boxlike housings pivotally connected together adjacent an edge of each and the portions of the housings opposite the pivot being of segmental shape, the walls of the housings aside from the pivoted walls being extended beyond the transverse plane of the pivot and arranged in telescopic relation with respect to each other, removable covers for said housings and common pivotal means for said housings that also maintain the covers in position.

3. An adjustable joint for conduits and the like comprising a pair of channel members, means pivotally connecting the ends of two adjacent walls of said members together for relative hinging movement, the walls of said members opposite the pivot being concavo-convex on a curve struck from the center of the pivot and the bottom walls having segmental edges opposite the pivot, and separate cover-plates for each member maintained in position by means that hinge said members, said cover-plates having overlapped adjacent edges and segmental edges opposite the pivot that conform with the curvature of the concavo-convex walls, said segmental and concavo-convex walls and the respective cover-plates arranged in overlapped telescopic relation to each other.

4. A device of the kind described comprising a pair of channel members having hinging movement relative to each other and telescopically arranged, separate cover plates for said members having overlapped adjacent edges, and pivotal means connecting said members for relative movement and maintaining said cover-plates in position.

5. A device of the kind described comprising a pair of channel members having hinging movement relative to each other and telescopically arranged, separate cover plates for said members having overlapped adjacent edges, and a bolt passing transversely through overlapped portions of said members and corresponding portions of the cover-plates whereby to connect said members and cover-plates for relative movement and to maintain said cover-plates in position.

Signed at Chicago, in the county of Cook, and State of Illinois this 19th day of April, 1926.

PAUL M. HOTCHKIN.